Patented Oct. 17, 1933

1,931,058

UNITED STATES PATENT OFFICE

1,931,058

MANUFACTURE OF PHENYL ESTERS OF PHOSPHORIC ACID

Erik Clemmensen, St. Louis, Mo., assignor, by mesne assignments, to Monsanto Chemical Company, a corporation of Delaware No Drawing. Application August 20, 1931
Serial No. 558,337

8 Claims. (Cl. 260—98)

This invention deals with the purification of phosphate esters such as phenyl phosphates and thio phosphates according to which the crude ester is treated, preferably in the presence of an aqueous medium, with a small quantity of a permanganate whereby the color and odor imparting impurities are destroyed without decomposition of the ester. The manganese dioxide formed as the result of this treatment is dissolved by means of mineral acid and removed from the product by washing with water.

The phenyl esters of phosphoric acid including thiophosphoric acid, examples of which are triphenylphosphate, tritolylphosphate, triphenylthiophosphate, tritolylthiophosphate, as well as the corresponding alkyl and the mixed alkyl alphyl esters, are used extensively in the manufacture of nitrocellulose and acetyl cellulose products. These esters are prepared (1) by heating the alcohol, such as a phenol, with phosphorus oxychloride, (2) by causing an alkali metal phenate to react with phosphorus oxychloride in an aqueous medium maintained at low temperatures and (3) by causing phosphorus oxychloride to react in an inert medium with an alkali metal phenate. The corresponding thiophosphoric acid esters are made in an analogous manner. The esters made by these processes invariably contain impurities which impart color and odor to the ester and which suffer decomposition in the presence of actinic ray. Inasmuch as these esters evidence a slight decomposition at or near their boiling points even under greatly reduced pressures, their purification by distillation is unsatisfactory. Moreover, distillation appears to have developed a fluorescent cast in the liquid phosphate esters which destroys the otherwise normal, clear, colorless character of the liquid ester products. Various materials have been employed for the purpose of destroying or removing the color, odor and light sensitive impurities, including bone-char, charcoal and other absorptive agents without complete success and generally at a substantial sacrifice in yield.

Crystallization from solvents such as alcohol particularly when employed in conjunction with charcoal or bone-char results in a satisfactory product, but suffers the disadvantage of costly solvents and extensive equipment. Moreover, the necessity of reworking the mother liquor as well as of partly purified crops of crystals and recovery of solvent renders this process both cumbersome and costly.

The present invention affords a method of manufacturing phenyl phosphates and thio phosphates that gives substantially quantitative yields of a water-white, clear product without the necessity of extensive refining operations, including distillation, as have been customary and necessary heretofore.

I have now discovered that the impurities which are light sensitive or impart color or odor to this class of phenyl esters may be completely and easily removed or destroyed by treatment with an aqueous solution of a permanganate, such as potassium permanganate.

According to this invention the crude phenyl ester, which invariably is of a yellowish or brownish hue, has a characteristic odor and suffers discoloration upon exposure to ultra-violet rays, is agitated with an aqueous solution of a permanganate at ordinary or slightly elevated temperatures. After the permanganate is no longer consumed by the ester, evidencing complete removal of undesirable impurities, the excess permanganate is removed by washing with water or destroyed by adding a small amount of a sulfite or acid sulfite thereto. Any precipitated manganese dioxide is dissolved by means of an acid, such as hydrochloric, sulfuric or sulfurous, which is washed from the product by means of water. The resulting ester is then dried in any convenient manner. The product so obtained is colorless, odorless, stable in the presence of actinic ray and otherwise will be suited for use in cellulose ester technology.

As a source of permanganate one may employ the soluble salts thereof including sodium, potassium or calcium derivatives. For the purpose of removing precipitated manganese dioxide, I prefer to employ sulfuric acid which may be removed completely and easily from the purified ester by washing with water. Obviously, the manganese dioxide precipitate may be separated from the ester in other ways, as by filtration, if desired.

An example of the manner of applying the principles of my invention to the purification of triphenyl phosphate is hereinafter set forth, it being understood that the invention is equally applicable to the refining and purification of other esters of this class.

A suitable vessel is charged with 200 parts of crude triphenylphosphate such as results from any of the well known processes for its manufacture and is agitated at about 50° C. for several hours with 800 parts of .3% of aqueous potassium permanganate. Additional permanganate should be added if an excess as evidenced by its color does not persist for a period of a half hour in the mixture containing the crude phosphate. Thereupon the excess permanganate is removed by washing with water after which any precipitated manganese dioxide that remains is dissolved by adding sulfuric acid thereto. Subsequently, the ester is washed with water until it is free of acid and afterward is dried.

Although the permanganate treatment is applicable regardless of the method by which the phosphates are formed, I have found that the permanganate treatment is particularly effective when employed in conjunction with a method of manufacturing esters which consists in causing the free phenol to react with phosphorus oxychloride, preferably in the presence of aluminum chloride, below the boiling point of the reactants. For this purpose water free phenol or cresols are mixed with approximately one-half percent by weight of anhydrous aluminum chloride. Thereafter the theoretical quantity of phosphorus oxychloride is added thereto slowly and with agitation while maintaining the temperature at 85°–105° C. After all of the oxychloride has been added the temperature is raised to 110°–130° C. for 2–4 hours, in order to assure completion of the reaction as well as to eliminate the hydrogen chloride. Subsequently, the reacted mixture is washed first with a dilute base such as caustic soda (1.5%), preferably at a moderately elevated temperature (45°–50° C.), whereby any hydrogen chloride, unreacted phenol, phosphorus oxychloride, monophenyl phosphorus oxychloride, and diphenyl phosphorus oxychloride are removed and thereafter the washing operation is completed with water prior to the permanganate treatment.

The present application is a continuation-in-part of my co-pending application, Serial Number 485,317, filed September 29, 1930.

What I claim is:

1. In the refining of phosphate esters obtained by the condensation of phosphorus oxy chloride and a phenol with the elimination of hydrogen chloride, that step which consists in treating the crude phosphate ester with a water soluble permanganate.

2. The method as defined in claim 1 and further characterized in that the permanganate is present in an aqueous solution.

3. The method of refining phosphate esters obtained by the condensation of phosphorous oxy chloride and a phenol with the elimination of hydrogen chloride which comprises treating a crude phosphate ester with a water-soluble permanganate in the presence of an aqueous medium, washing the excess permanganate from the mixture by means of water and dissolving any precipitated manganese dioxide by means of a strong mineral acid.

4. The process as defined in claim 3, wherein the precipitated manganese dioxide is dissolved with sulfuric acid.

5. The method of manufacturing phenyl phosphate esters which consists in reacting a phenol with phosphorus oxychloride in the presence of aluminum chloride, washing the reacted mixture with a strong inorganic base, subsequently treating such washed mixture with an aqueous solution of a permanganate, removing the excess permanganate and any precipitated manganese dioxide, and finally drying the product.

6. In the refining of aryl phosphate esters obtained by the condensation of phosphorous oxy chloride and a phenol with the elimination of hydrogen chloride that step which consists in treating the crude phosphate ester with an aqueous solution of an alkali metal permanganate.

7. The method of manufacturing aryl phosphate esters which consists in reacting a phenol with phosphorous oxy chloride whereby hydrogen chloride is evolved, washing the reacted mixture with a strong inorganic base, subsequently treating the ester with an aqueous solution of a permanganate, recovering the ester from the excess permanganate solution and the precipitated manganese dioxide formed in the course of the permanganate treatment and finally drying the product.

8. The method as defined in claim 7 and further characterized in that the strong inorganic base is an alkali metal hydroxide.

ERIK CLEMMENSEN.